United States Patent [19]
Nojima et al.

[11] Patent Number: 5,520,467
[45] Date of Patent: May 28, 1996

[54] ROLLING BEARING FOR USE IN MOLTEN METAL

[75] Inventors: Katsuhiro Nojima; Toshihiro Mori; Takao Hashimoto, all of Osaka; Shin Niizeki; Akio Aoki, both of Kanagawa, all of Japan

[73] Assignees: NGK Ltd., Tokyo; Sumitomo Metal Industries, Ltd., Osaka, both of Japan

[21] Appl. No.: 303,935

[22] Filed: Sep. 9, 1994

[30] Foreign Application Priority Data

Sep. 9, 1993 [JP] Japan ................... 5-049121 U
Sep. 9, 1993 [JP] Japan ................... 5-224641

[51] Int. Cl.⁶ ........................................ F16C 33/44
[52] U.S. Cl. .................. 384/470; 384/403; 384/907
[58] Field of Search ............................ 384/463, 470, 384/907

[56] References Cited

U.S. PATENT DOCUMENTS

| | | | |
|---|---|---|---|
| 2,569,531 | 10/1951 | Kunzog . | |
| 3,356,427 | 12/1967 | Van Wyk | 384/463 |
| 3,390,928 | 7/1968 | Davies et al. | 384/463 |
| 4,906,110 | 3/1990 | Van Wyk et al. | 384/463 |
| 5,356,227 | 10/1994 | Sibley et al. | 384/463 |

FOREIGN PATENT DOCUMENTS

| | | | |
|---|---|---|---|
| 0159487 | 10/1985 | European Pat. Off. . | |
| 478434 | 4/1992 | European Pat. Off. | 384/463 |
| 2065029 | 1/1972 | Germany . | |
| 4210060 | 10/1992 | Germany . | |
| 4235838 | 4/1993 | Germany . | |
| 4133813 | 4/1993 | Germany . | |
| 79418 | 3/1989 | Japan | 384/463 |
| 5187445 | 7/1993 | Japan . | |

OTHER PUBLICATIONS

DE–Z H.–J.Holland and W. Rublinger, "Gebrauchsdauer festoffgeschnierter Walzlager fur nichtatmospharische Umgebungsbedingungen", Konstruktion 34 (1982) H.3, pp. 93–98.

DE–Z W. Thiele, "Kohlegrafit: Werkstoff fur schmierstoff-freie Dichtungen und Lagerungen", Tribolgie+Schmierungs-stechnik, edition, Apr. 1992 pp. 202–208.

*Primary Examiner*—Thomas R. Hannon
*Attorney, Agent, or Firm*—Sughrue, Mion, Zinn, Macpeak & Seas

[57] ABSTRACT

A rolling bearing to be used in molten metal provides inner and outer races, a plurality of rolling elements and a cage, in which a solid lubricant is exposed at least in contact surfaces between the cage and the plurality of rolling elements, and further in which the solid lubricant is exposed also in contact surfaces between the cage and the inner and outer races. The cage is formed of a material having specific gravity of 0.8 to 1.2 with respect to the molten metal. In the rolling bearing, the wear resistance of the inner and outer races, the rolling elements and the cage can be improved.

5 Claims, 4 Drawing Sheets

ROLLING BEARING FOR USE IN MOLTEN METAL

BACKGROUND OF THE INVENTION

The present invention relates to a rolling bearing for use in molten metal, such as a rolling bearing to be incorporated in a roll support device in a continuous molten zinc plating bath or a hot-dip galvanizing bath.

Conventionally, as a rolling bearing to be used in molten metal, such as a rolling bearing to be incorporated in a roll support device in a continuous molten zinc plating bath, there is proposed a rolling bearing (see Unexamined Japanese Patent Publication No. Hei. 5-187445) which is formed of ceramics except for a cage having a complicated shape, because it requires high heat resistance and high corrosion resistance. In this rolling bearing, the cage is formed of pure tantalum or an alloy of tantalum and tungsten in the range of 10% or less by weight in order to improve its corrosion resistance.

However, when the cage is formed of the material proposed in Unexamined Japanese Patent Publication No. Hei. 5-187445, then the cage provides sufficient corrosion resistance in molten metal but it leaves some room for improvement in wear resistance.

SUMMARY OF THE INVENTION

The present invention aims at eliminating problems found in a conventional rolling bearing. Accordingly, it is an object of the present invention to improve the wear resistance of inner and outer races and rolling elements which constitute a rolling bearing to be used in a device supporting member that is in molten metal. It is another object the present invention to improve the wear resistance of a cage which constitutes the bearing to be used in molten metal.

In attaining the objects, according to a first aspect of the present invention, there is provided a rolling bearing to be used in molten metal which provides inner and outer races, a plurality of rolling elements and a cage, in which a solid lubricant is exposed at least in contact surfaces between the cage and the plurality of rolling elements.

According to a second aspect of the present invention, in the rolling bearing according to a first aspect of the present invention, the solid lubricant is exposed also in contact surfaces between the cage and the inner and outer races.

According to a third aspect of the present invention, there is provided a rolling bearing to be used in molten metal in which a cage constituting the present rolling bearing is formed of a material having specific gravity of 0.8 to 1.2 with respect to the molten metal.

According to the first aspect of the present invention, since the solid lubricant is exposed at least in the contact surfaces of the cage of the rolling bearing to be used in the molten metal with the rolling elements thereof, with the rotation of the rolling elements, the solid lubricant peeled from the pocket of the cage adheres to the rolling elements and the solid lubricant adhered to the rolling elements then moves and adheres to the surfaces of the inner and outer races. That is, since the solid lubricant having a high lubricating property exits between the cage and rolling elements, as well as between the rolling elements and inner and outer races and performs a lubricating action there, the amounts of wear of the inner and outer races and rolling elements can be reduced even if the rolling bearing is used at a high temperature in molten metal having a highly corrosive property.

Also, in addition to the contact surfaces with the rolling elements, according to the second aspect of the present invention, the solid lubricant is also exposed in the contact surfaces thereof with the inner and outer races, there is produced a possibility that the solid lubricant can directly adhere to the inner or outer races from the cage, whereby a higher lubricating action can be expected and the amounts of wear of the inner and outer races and rolling elements can be minimized.

Further, according to the third aspect of the present invention, since the cage of the rolling bearing to be used in the molten metal is formed of a material which has specific gravity of 0.8 to 1.2 with respect to the molten metal, the pressure of the cage against the sliding surfaces thereof with the rolling elements and inner and outer races can be reduced greatly to thereby improve the wear resistance of the pocket and guide surfaces of the cage.

Further, the inner and outer races and rolling elements are formed of the material that has heat resistance according to the molten metal and, preferably, they may be formed of ceramics such as silicon nitride and the like.

BRIEF DESCRIPTION OF THE DRAWINGS

In the accompanying drawings

DETAILED DESCRIPTION OF THE PREFERRED EMBODIMENTS

Description will be given below in more detail of a rolling bearing to be used in molten metal according to the present invention.

Generally, the rolling bearing includes an outer race having an outer raceway on the inner circumferential surface, an inner race having an inner raceway on the outer circumferential surface, a cage having a plurality of pockets in the circumferential direction, and a plurality of rolling elements which are retained so as to be rollable within the respective pockets and whose rolling surfaces are abutted against the outer raceway and the inner raceway.

According to the present invention, since a cage which constitutes the rolling bearing to be used in the molten metal is formed of a material which has specific gravity of 0.8 to 1.2 with respect to the molten metal, the wear resistance of the cage can be improved.

That is, by reducing a difference in density between the cage and molten metal, the degree that the cage sinks and floats in the molten metal can be reduced, so that the pressure to be applied onto the slide surfaces of the cage with the rolling elements and inner and outer race can be decreased.

On the other hand, as described before, when a cage is formed of pure tantalum or alloy of tantalum with tungsten in the range of 10% or less by weight and a rolling bearing with such cage incorporated therein is used in a continuous molten zinc plating bath (480° C.), the specific gravity of the material forming the cage provides 2.3 with respect to the molten zinc since the density of pure tantalum or the above-mentioned tantalum alloy is of the order of 16 g/cm$^3$, that is, the degree that the cage sinks and floats in the molten zinc is great, so that the pressure to be applied onto the sliding surfaces of the cage with the rolling elements and inner and outer races is increased.

Figure 9:
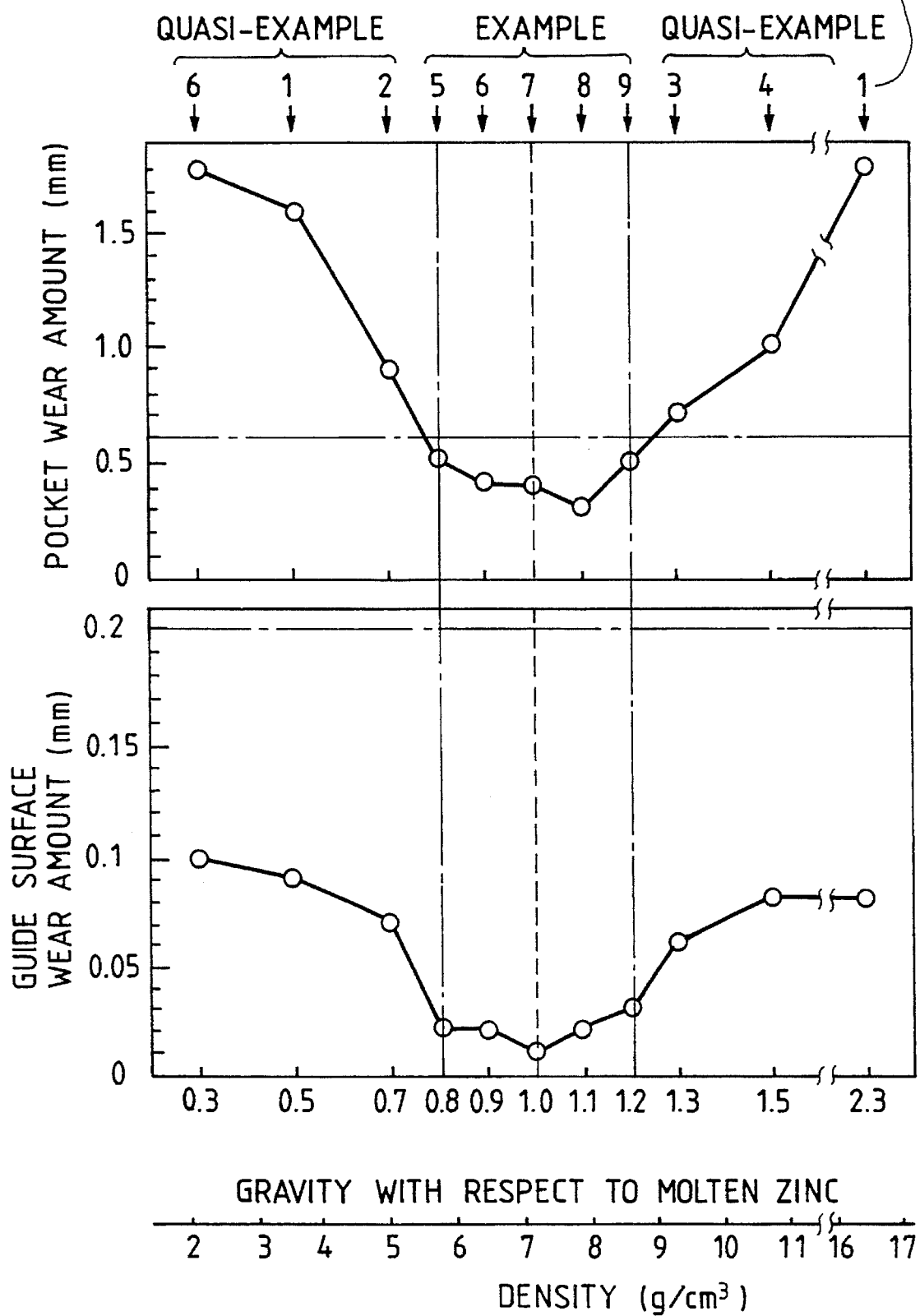
FIG. 9 is a graphical representation of the results of wear tests conducted on test samples (according to the examples 5 to 9, quasi-examples 1 to 4, 6, and comparative example 1) respectively incorporating a cage specimen formed of a composite material composed of Ta and C (graphite) into a uniformly mixed powder type.

Also, FIG. 9 is a graphical representation to show the results of wear tests (details of the tests are described later) in which a composite material consisting of Ta and C (graphite) is used to form specimens of cages respectively having specific gravity of 0.3 to 2.3 with respect to the molten zinc, and loads are applied to the respective specimens in the axial direction thereof in the molten zinc (480° C.). This graphical representation shows that the cage specimens having specific gravity of 0.8 to 1.2, namely, in the range of specific gravity specified by the present invention, with respect to the molten zinc are outstandingly superior to others in both of the pocket wear amount and the guide surface wear amount.

To make the specific gravity of the material forming the cage 0.8 to 1.2 with respect to the molten metal, according to the molten metal, the cage may be formed of a material by itself having specific gravity of 0.8 to 1.2, or the cage may be formed of a composite material having specific gravity of 0.8 to 1.2 with respect to the corresponding molten metal, which composite material may be formed by combining a material having a large density such as metals Ta, W, Nb, Mo, Re, Os, Ir, Pt, Au or the like, alloy including at least one of these metals, carbide with one of these metals, boride with one of these metals, nitride with one of these metals, with a material having a small density including carbon material such as graphite, C/C composite (carbon fiber reinforced carbon) or the like, or ceramics such as boron nitride, alumina, silica, silicon nitride, silicon carbide or the like.

When the cage is formed of the composite material, the material with a small density used to form the composite material may preferably be a solid lubricant such as graphite, hexagonal boron nitride (h-BN), molybdenum disulfide, tungsten disulfide, $CaF_2/BaF_2$, chrome oxide or the like.

As the molten metal to be used for a plating bath or the like, for example, there can be used the metals that are shown in Table 1 and the density of the molten metal may be in the range of 2 to 12 g/cm$^3$.

TABLE 1

| Name of Metals | Density (g/cm$^3$) | Melting Point (°C.) |
| --- | --- | --- |
| Zinc | 7.1 | 419 |
| Lead | 11.3 | 327 |
| Tin | 7.3 | 232 |
| Copper | 8.9 | 1,080 |
| Silver | 10.5 | 960 |
| Aluminum | 2.4 | 660 |

Also, ferric steel and nickel or cobalt heat resisting alloy are not preferable as the material of the cage to be incorporated into a rolling bearing for use in the molten metal, because they are lacking in corrosion resistance to the above-mentioned molten metals, even if the specific gravity there of with respect to the molten metals is in the range of 0.8 to 1.2.

EXAMPLES

Wear tests for the rolling bearing to be used in molten metal according to the present invention will be described below in more detail.

Figure 1:
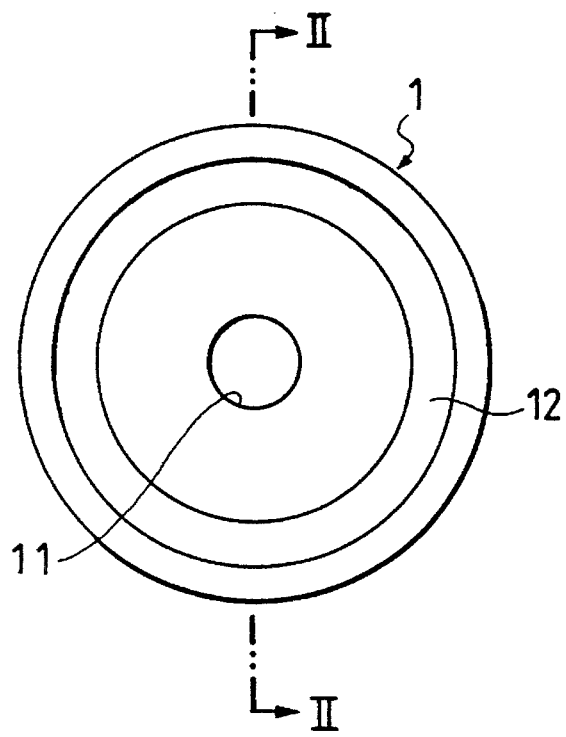
FIG. 1 is a front view of a race specimen forming a test sample for a wear test used in an embodiment of the present invention.
Figure 2:
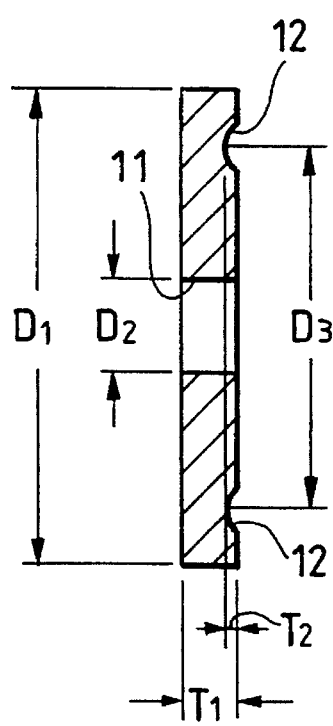
FIG. 2 is a section view taken along the line II—II in FIG. 1.
Figure 3:
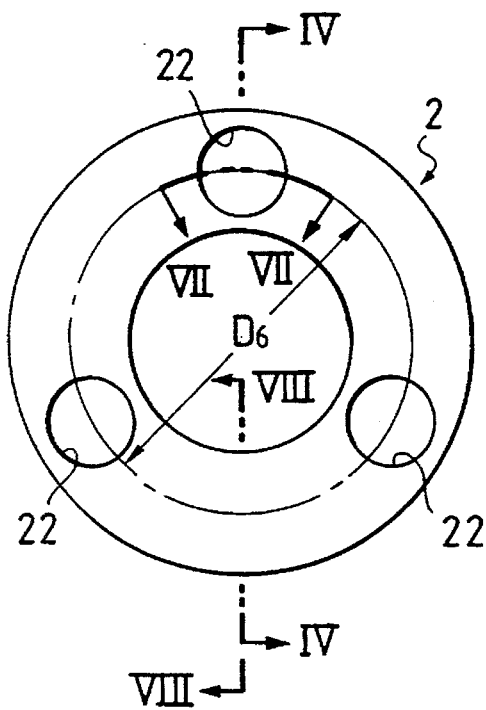
FIG. 3 is a front view of a cage specimen forming a test sample for a wear test used in the embodiment of the present invention.
Figure 4:
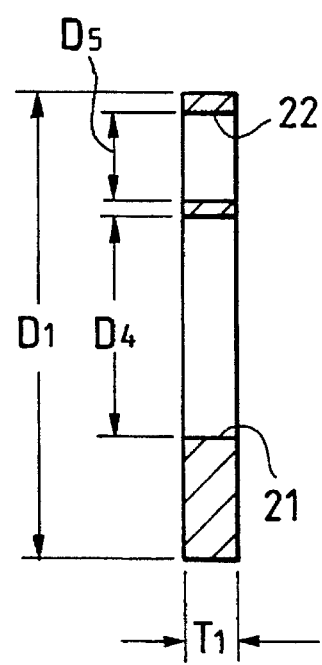
FIG. 4 is a section view taken along the line IV—IV
Figure 5:
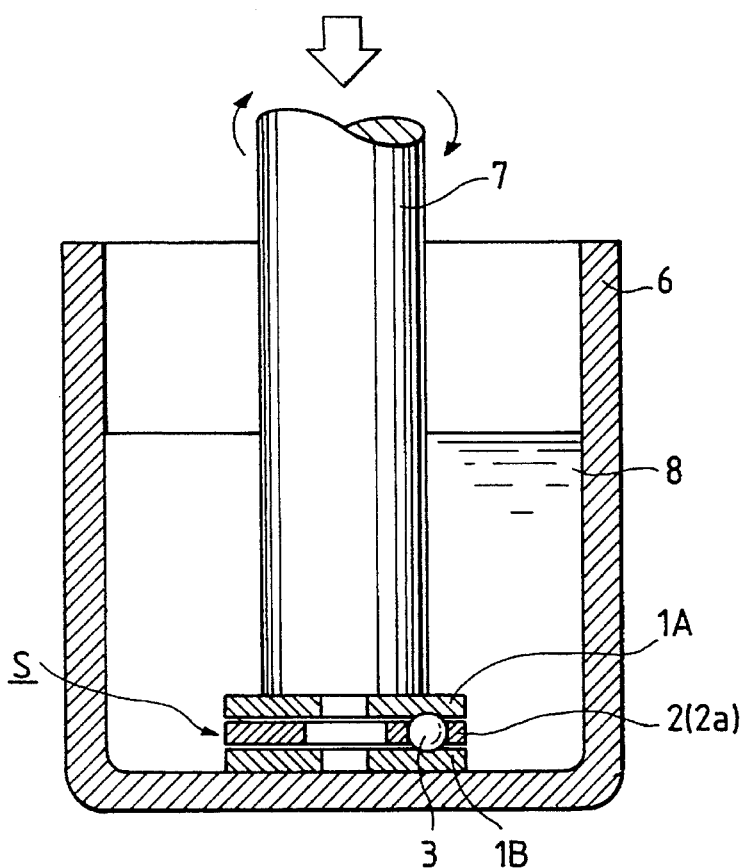
FIG. 5 is a general view of the outline of a wear test employed in the embodiment of the present invention.

Two race specimens 1 (corresponding to an inner race specimen 1A and an outer race specimen 1B) each having such a shape as shown in FIGS. 1 and 2, a cage specimen 2 having such a shape as shown in FIGS. 3 and 4, and three balls 3 each having a diameter of 3/8 inches were used as one set to assemble a wear-test sample S of a rolling bearing as shown in FIG. 5. FIG. 1 is a front view of a race specimen, FIG. 2 is a section view taken along the line II—II in FIG. 1, FIG. 3 is a front view of a cage specimen, and FIG. 4 is a section view taken along the line IV—IV in FIG. 3.

AS shown in FIGS. 1 and 2, the race specimen 1 is formed by opening up a hole 11 having a diameter $D^2=10$ mm in the central portion of a disk having a thickness $T_1=6$ mm and a diameter $D^1=52$ mm, and then forming an annular groove 12 concentric with the disk in the peripheral portion of one surface of the disk. The groove 12 has an arc-shaped section, has a radius of curvature of 5.15 mm, and is recessed by an amount up to 0.8 mm ($=T_2$) from the surface of the disk. Also, the diameter $D_3$ of the central line of the groove 12 is set for 38.5 mm.

The two race specimens 1 and balls 3 are formed of silicon nitride and are formed into their respective shapes in such a manner that powder of silicon nitride is pressurized and sintered under an atmosphere of Ar and $N_2$ and at a temperature of 2,000° C. and the thus sintered product is then machined.

Also, the cage specimen 2, as shown in FIGS. 3 and 4, is formed in the following manners that is, a hole 21 having a diameter $D_4=24$ mm is opened up in the central portion of a disk having the same size as the race specimen 1, three circular pockets 22 each having a diameter $D_5=9.8$ mm are formed in the surface of the disk at regular intervals in such a manner that the respective centers of the three pockets 22 are on the same circumference. And the pitch diameter $D_6$ of the pocket 22 is set for 38.5 mm which is equal to the diameter $D_3$ of the central line of the groove 12 formed in the race specimen 1.

The cage specimens 2 are respectively formed according to the respective test samples, that is, the cage specimens 2 are formed of the materials including such respective compositions as shown in the following Table 2 and Table 3 such that their respective specific gravity provides their stipulated values with respect to molten zinc. In the examples 1 to 9, quasi-examples 1 to 4, and comparative example 4, as the material having a large density, Ta, W, Mo, WC, TaN, or $TaB_2$ in a single form or in a combination there of is used, while, as the material having a small density, C (graphite), $MoS_2$, h-BN, or $Si_3N_4+Al_2O_3$ is used. The specific gravity with respect to the molten zinc is adjusted by changing the composition of the two kinds of large and small density materials.

Figure 6:
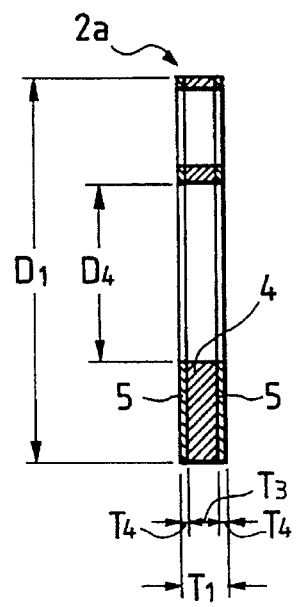
FIG. 6 is a section view of a cage specimen employed in an example 1 according to the present invention.

Here, the cage specimen 2a according to the example 1, as shown in FIG. 6 (which corresponds to a section view taken along the line IV—IV in FIG. 3), has the same appearance as the cage specimen 2 shown in FIGS. 3 and 4 but, in fact, the cage specimen 2a is structured by connecting two reinforcing side plates 5 formed of Ta and having a thickness $T_4=1$ mm on both surfaces of a mother member 4 formed of C (graphite) and having a thickness $T_3=4$ mm, For this reason, the cage specimen 2a is expressed as "reinforced type". And the average density of the whole cage specimen is calculated according to a volumetric ratio between Ta (two side plates 5) and C (mother member 4).

The cage specimens 2 according to the examples 2 to 9, quasi-examples 1 to 4 and comparative example 4, similarly to the above-mentioned race specimens 1 and balls 3, are respectively formed in such a manner that the powder materials of the their respective compositions are pressurized and sintered under the atmosphere of Ar and $N_2$ and at a temperature of 2000° C. and the thus sintered materials are then machined. In Tables, they are expressed as "uniformly mixed powder type". And the average density is calculated according to the densities and volumetric ratios of the respective compositions that form the materials of the cage specimens.

The cage specimens 2 according to the quasi-examples 5 to 7 and comparative examples 1 to 3 are respectively formed of a single material, that is, the cage specimens 2 are formed in the above-mentioned shapes by machining the following bulk materials (the cage specimen 2 according to the comparative example 3 uses SUS304), and they are expressed as "bulk type" in Tables.

| Materials | |
|---|---|
| Ta: | Manufactured by Shinkuu Yakin Co. Ltd. |
| C/C composite: | Manufactured by Toyo Tanso Co. Ltd. CX-21 |
| Graphite: | Manufactured by Toyo Tanso Co. Ltd. IG-43 |
| h-BN machinable ceramics: | Manufactured by Tokuyama Soda Co. Ltd., Shapal (Registered trademark) M |
| Mica machinable ceramics: | Manufactured by Mitsui Mining Co. Ltd. |

As shown in FIG. 5, the cage specimen 2 with the balls received in the pockets 22 was held by and between the two race specimens 1A and 1B of which surfaces forming the grooves were opposed to each other to store the balls 3 into the respective grooves 12, thereby assembling a test sample S for the wear test. In this condition, the test sample S was located at the center of the bottom portion of a crucible 6 i.e., a bath, a rotary shaft 7 was located at the center of the upper side race specimen (the inner race specimen) 1A and a load was applied to the rotary shaft 7 in the axial direction thereof, the molten zinc 8 was poured into the crucible 6, the rotary shaft 7 was rotated to thereby rotate the upper side race specimen 1A, and the wear test was conducted under the following condition:

| Test Conditions | |
|---|---|
| Axial load: | 294 N |
| Speed of rotation: | 300 rpm |
| Temperature within crucible: | 480° C. |
| Total time of rotation: | 72 hours |

Figure 7A:
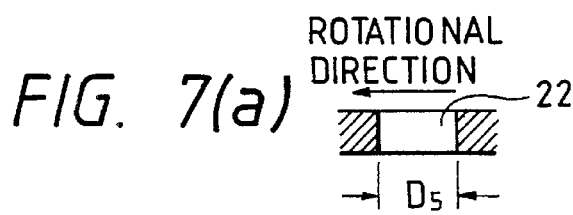
FIGS. 7(a) and 7(b) are explanatory views of a pocket wear amount in a cage specimen, corresponding to a section view taken along the line VII—VII in FIG. 3.
Figure 7B:
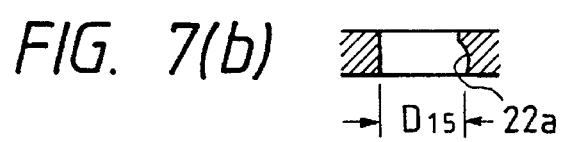
Figure 8A:
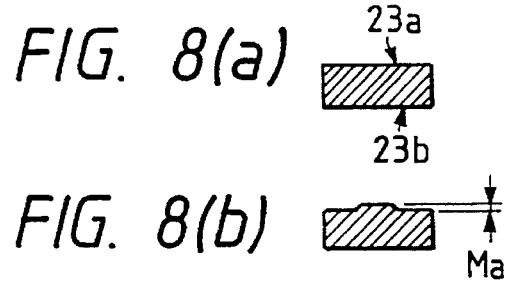
FIG. 8(a) and 8(b) are explanatory views of a guide surface rear amount in a cage specimen, corresponding to a section view often along the line VIII—VIII in FIG. 3.
Figure 8B:
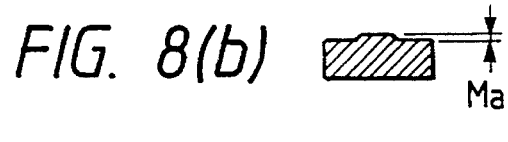

After the test, the test sample S was taken out from the crucible 6 and the pocket wear amounts and the guide surface-wear amounts of the respective cage specimens 2 (2a) were measured. The results of the wear test are collectively shown in the following Tables 2 and 3. Also, the pocket wear amount of the cage specimen is shown in FIGS. 7(a) and 7(b) and the guide surface wear amount of the cage specimen is shown in FIGS. 8(a) and 8(b). Here, FIGS. 7(a) and 7(b) correspond to a section view taken along the line VII—VII in FIG. 3. FIGS. 8(a) and 8(b) correspond to a section view taken along the line VIII—VIII in FIG. 3. FIGS. 7(a) and 8(a) point out states of the cage specimens before the wear test is conducted, while FIGS. 7(b) and 8(b) point out states thereof after the wear test is conducted, respectively.

Here, the cage specimen 2 having specific gravity smaller than 1 with respect to the molten zinc rotates in contact with the upper race specimen 1A during the wear test. Since the ball 3 rotates about the rotary shaft 7 at one half of the rotational speed of the upper race specimen 1A, the cage specimen 2 rotates at the same speed of the ball 3. During such rotational movements, there is produced sliding motion between the upper race specimen 1A and cage specimen 2 and, as a result of this, as shown in FIGS. 8(a) and 8(b), the upper guide surface 23a (the guide surface put on the upper race specimen 1 side during the test) of the cage specimen 2 is worn. An amount of reduction $M_a$ in the thickness of the guide surface resulting from such wear was measured and this is expressed as the guide surface wear amount.

Also, since the pocket 22 of the cage specimen 2 is always in contact with the ball in such a manner that it is always pressing against the ball 3, there is produced sliding motion between the ball 3 and pocket 22, as shown in FIGS. 7(a) and 7(b), the rear side 22a of the pocket 22 in the rotational direction is worn. An amount of increase $M_f (=D_{13}-D_3)$ in the diameter of the pocket 22 resulting from such wear was measured and it is expressed as the pocket wear amount.

Here, since the cage specimen 2 having specific gravity larger than 1 with respect to the molten zinc rotates in contact with the lower side race specimen 1B during the wear test, on the contrary to the above, the lower guide surface 23b of the cage specimen 2 and the front side of the pocket 22 in the rotational direction are worn.

The allowable values of the respective wear amounts were set in the following manner: that is, the diameter $D_a$ of the ball that is a rolling element was used as a reference, it was assumed that the wear amounts increase linearly with respect to time, and the test samples are to be continuously operated for two weeks. The allowable values set in this manner for the pocket wear amount was 30% or less of the diameter $D_a$ and the allowable values for the guide surface wear amount was 10% or less of the diameter $D_a$.

And the diameter of the ball used, namely, $D_a$ was 3/8 inches =9.525 mm, and this wear test was conducted for 72 hours (=for three days). By converting these, the pocket wear amount was approved as qualified if it is 9.525×0.30× (3/14)=0.61 mm or less, and the guide surface wear amount was approved if it is 9.525×0.10×(3/14)=0.20 mm or less.

TABLE 2

| Test Sample No. | Composition of Cage Specimen (vol %) | Structure of Cage Specimen | Average Density (g/cm$^3$) | Specific Gravity with Respect to Molten Zinc | Pocket Wear Amount (mm) | Guide Surface Wear Amount (mm) |
|---|---|---|---|---|---|---|
| Example 1 | Ta 33.3/C 66.7 | Reinforced type | 7.03 | 1.0 | 0.3 | 0.01 |
| Example 2 | V 10.1-Mo 16.0/MoS$_2$ 73.9 | Uniformly mixed powder type | 7.13 | 1.0 | 0.5 | 0.02 |
| Example 3 | W 14.4-WC 24.8/C 60.8 | Uniformly mixed powder type | 7.13 | 1.0 | 0.4 | 0.02 |
| Example 4 | Ta 12.5-TaN 17.8-TaB$_2$ 8.9/h-BN 60.8 | Uniformly mixed powder type | 7.13 | 1.0 | 0.5 | 0.01 |
| Example 5 | Ta 24.1/C 75.9 | Uniformly mixed powder type | 5.71 | 0.8 | 0.5 | 0.02 |
| Example 6 | Ta 29.0/C 71.0 | Uniformly mixed powder type | 6.41 | 0.9 | 0.4 | 0.02 |
| Example 7 | Ta 34.0/C 66.0 | Uniformly mixed power type | 7.13 | 1.0 | 0.4 | 0.01 |
| Example 8 | Ta 39.0/C 61.0 | Uniformly mixed powder type | 7.85 | 1.1 | 0.3 | 0.02 |
| Example 9 | Ta 43.9/C 56.1 | Uniformly mixed powder type | 8.55 | 1.2 | 0.5 | 0.03 |

TABLE 3

| Specimen No. | Composition of Cage Specimen (vol %) | Structure of Cage Specimen | Average Density (g/cm$^3$) | Specific Gravity with Respect to Molten Zinc | Pocket Wear Amount (mm) | Guide Surface Wear Amount (mm) |
|---|---|---|---|---|---|---|
| Quasi-Example 1 | Ta 9.2/C 90.8 | Uniformly mixed powder type | 3.57 | 0.5 | 1.6 | 0.09 |
| Quasi-Example 2 | Ta 19.1/C 80.9 | Uniformly mixed powder type | 4.99 | 0.7 | 0.9 | 0.07 |
| Quasi-Example 3 | Ta 48.9/C 51.1 | Uniformly mixed powder type | 9.27 | 1.3 | 0.7 | 0.06 |
| Quasi-Example 4 | Ta 58.9/C 41.1 | Uniformly mixed powder type | 10.7 | 1.5 | 1.0 | 0.08 |
| Quasi-Example 5 | C/C composite | Bulk type | 2.25 | 0.3 | 1.0 | 0.18 |
| Quasi-Example 6 | C (graphite) | Bulk type | 2.25 | 0.3 | 1.8 | 0.10 |
| Quasi-Example 7 | h-BN machinable ceramics | Bulk type | 3.00 | 0.4 | 1.0 | 0.11 |
| Comparative example 1 | Ta 100.0 | Bulk type | 16.6 | 2.3 | 1.8 | 0.08 |
| Comparative example 2 | Mica machinable ceramics | Bulk type | 2.70 | 0.4 | 1.3 | 0.15 |
| Comparative example 3 | SUS304 | Bulk type | 8.00 | 1.1 | 7.5 | 2.60 |
| Comparative example 4 | TaN 34.4/Si$_3$N$_4$ 53.4-Al$_2$O$_3$ 12.2 | Uniformly mixed powder type | 7.13 | 1.0 | 0.6 | 0.04 |

Also, as to the test samples (examples 5 to 9, quasi-examples 1 to 4, 6, and comparative example 1) respectively incorporating therein cage specimens which were respectively formed of a composite material consisting of Ta and C (graphite) into a uniformly mixed powder type, wear tests were conducted and the results of the wear tests were arranged. In FIG. 9, there are shown the arranged results of the wear tests on the above test samples.

These results show that the test samples respectively incorporating therein the cage specimens having specific gravity of 0.8 to 1.2 with respect to the molten zinc according to the examples 1 to 9 and the comparative example 4 fall within the allowed values in the results of both pocket wear amounts and guide surface wear amounts. Also, the test samples respectively incorporating therein the cage specimens having specific gravity smaller than 0.8 or larger than 1.2 with respect to the molten zinc according to the quasi-examples I to 7 and comparative examples 1 to 3 fall within the allowed values in the guide surface wear amounts but provide larger values than the allowed values in the pocket wear amounts. Here, in the comparative example 3, the cage specimen has specific gravity with respect to the molten zinc and thus the cage specimen falls within the scope of the present invention. However, it can be considered that the wear amount of the comparative example 3 becomes large because of the insufficient corrosion resistance of SUS 304 to the molten zinc.

Also; in the comparative example 4, the cage specimen incorporated therein has specific gravity of 1.0 with respect to the molten zinc and, therefore, both of the pocket wear amount and guide surface wear amount of the comparative example 4 fall within the allowed values. However, as described later, because the comparative example 4 does not use solid lubricant, the ball wear amount thereof becomes great.

On the other hand, in Table 4, there are shown the results of measurement of the wear amounts of the balls 3 incorporated in the examples 2 to 4, 7, quasi-examples 5, 6, and comparative example 4. In these test samples, each of the cage specimens 2 is formed of a composite material and, as a material having small density which forms the composite material, there are used $MoS_2$ in the example 2, C (graphite) in the examples 3 and 7, h-BN in the example 4, $Si_3N_4$ and $Al_2O_3$ in the comparative example 4, C/C composite (bulk type) in the quasi-example 5, and graphite (bulk type) in the quasi-example 6.

TABLE 4

| Test Sample No. | Wear Amount of Ball (mm) |
| --- | --- |
| Example 2 | 0.06 |
| Example 3 | 0.00 |
| Example 4 | 0.03 |
| Example 7 | 0.00 |
| Quasi-Example 5 | 0.00 |
| Quasi-Example 6 | 0.00 |
| Comparative example 4 | 0.12 |

As can be seen from the results shown in Table 4, in the examples 2 to 4, 7 and quasi-examples 5, 6 respectively containing solid lubricant such as $MoS_2$, C (graphite) or h-BN in the material of the cage specimens thereof, the ball wear amounts thereof are excessively smaller when compared with the comparative example 4 containing no solid lubricant. Especially, no wear is found in the examples 3, 7 and quasi-examples 5, 6 which contain graphite therein.

Therefore, when the cage material is formed of a composite material, it is preferable to use the solid lubricant, especially, graphite as a material having small density for the purpose of minimizing the ball wear amounts. Also, in the quasi-examples 5, 6, comparative example 1 (pure Ta), and comparative example 5 (the cage was formed of Ta-W alloy [Ta:W=9:1 (by weight)] manufactured by Shinkuu Yakin Co. Ltd.), the wear amounts of the inner race specimen 1A and outer race specimen 1B after teat were also measured. The results of the above measurement are shown in FIG. 12.

Figure 12:
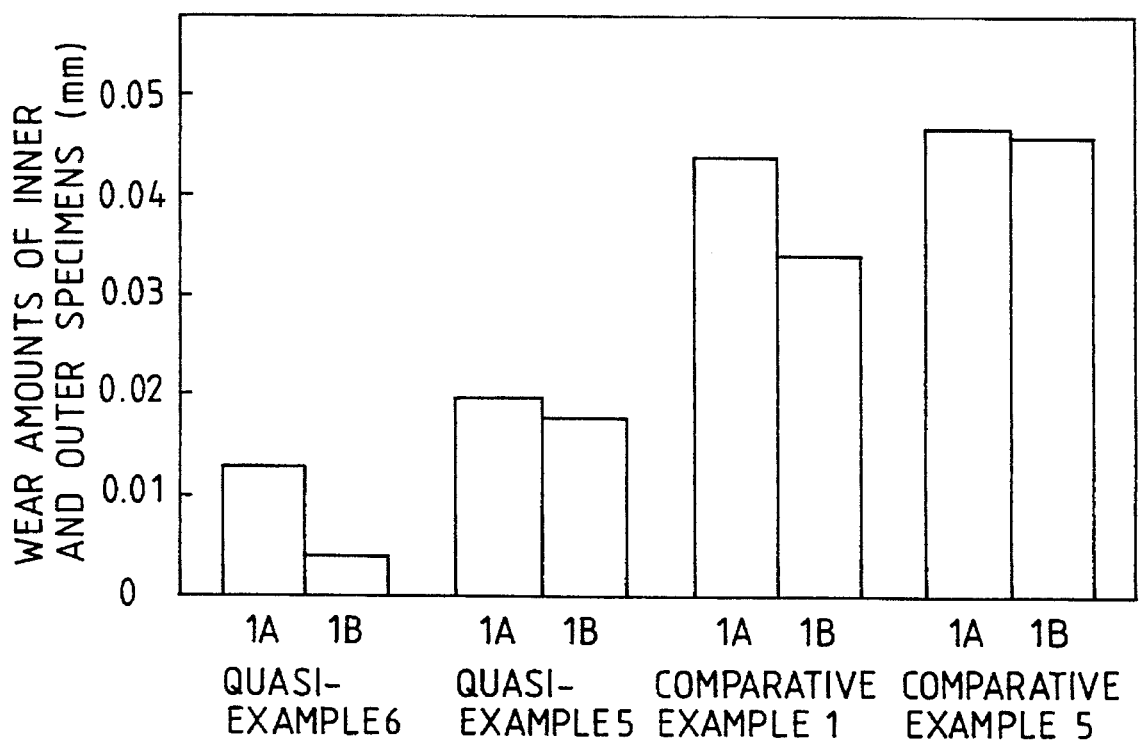
FIG. 12 is a graphical representation of the results of measurement of the wear amounts of inner and outer race specimens in the wear tests conducted on test samples according to the quasi-examples 5 and 6, and comparative examples 1 and 5.

As shown in FIG. 12, similarly to the balls, in the inner race specimen 1A and outer race specimen 1B as well, the wear amounts of the quasi-examples 5, 6 respectively containing a solid lubricant or graphite were smaller than those of the comparative examples 1, 5. That is, it is confirmed that, if the cage is formed of graphite or a composite material containing graphite, then the wear amounts of the inner and outer races can be reduced.

For reference, in a rolling bearing which is incorporated in a roll support device or the like in a continuous molten zinc plating bath, vibrations or shocks can be applied to the rolling bearing. Here, it is preferable to use, as the material of a cage, a composite material containing graphite such as a C/C composite rather than graphite only, because such composite material can increase the strength of the cage.

In the above test, for the inner race specimen 1A and outer race specimen 1B, an amount of increase in the depth of the groove 12 was considered as the wear amount thereof and, for the ball 3, an amount of reduction in the diameter of the ball 3 was considered as the wear amount thereof.

Figure 10:
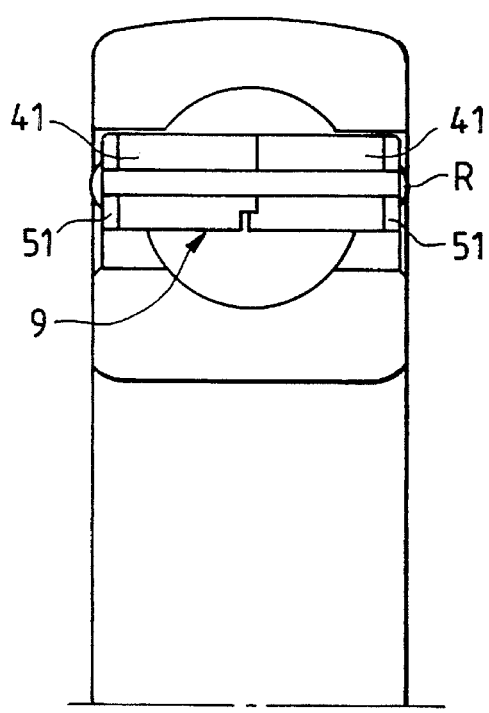
FIG. 10 is a general view of an example of the structure of a rolling bearing corresponding to a reinforced type according to the example 1.
Figure 11:
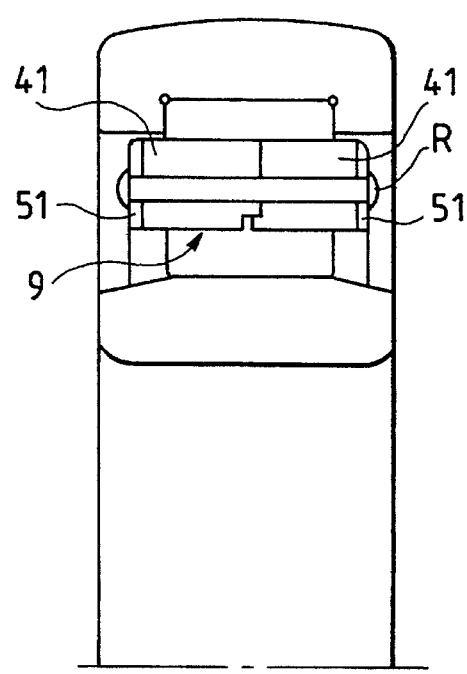
FIG. 11 is a general view of an example of the structure of a rolling bearing corresponding to a reinforced type according to the example 1.

Examples of the structure of a rolling bearing corresponding to the reinforced type of the example 1 are respectively shown in FIGS. 10 and 11. In particular, FIG. 10 shows the structure of a deep groove ball bearing, while FIG. 11 shows the structure of a cylindrical roller bearing, in both of which the bisected portions of a cage 9 are fastened together by a rivet R formed of Ta. The cage 9 consists of a main body 41 and two side plates 51 for reinforcing the two sides of the main body 41, while the main body 41 (including a pocket surface) is formed of graphite or a C/C composite and the side plates 51 are respectively formed of Ta.

The rivet formed of Ta can be applied not only to such reinforced type as in the example 1 but also to a cage of a bisected type. This can also apply to the use of a bolt and a nut instead of the rivet. Referring to the material of the bolt, nut and rivet to be used as a fastening member, as the material of the rivet, besides Ta, it is preferable to use a material which is highly resistant to corrosion and is deformable plastically, for example, a metal having a high melting point such as W, Nb, Mo, Re or the like, or an alloy thereof. And, as the material of the bolt and nut, it is preferable to use the above-mentioned rivet material or machinable ceramics. As the machinable ceramics to be used for the bolt and nut, there are available a mica "macelite" manufactured by Mitsui Mining Co. Ltd, h (hexagonal)-BN "Shapal (registered trademark) M" manufactured by Tokuyama Soda Co. Ltd., and the like.

As described before, in the above examples of the present invention, there are included quasi-examples. Although the quasi-examples are not sufficient to improve the wear resistance of the cage of the rolling bearing, which is a second object of the present invention, they are sufficiently capable of improving the wear resistance of the inner and outer races and rolling elements of the rolling bearing, which is a first object of the present invention. In this sense, the quasi-examples fall within the scope of the present invention.

Further, according to the above-described examples of the present invention, zinc is used as the molten metal. Even if all kinds of the molten metal and molten alloy are used instead of zinc, the present invention can obtain the same effects as in the molten zinc. For instance, the example 10 the same as the cage specimen according to the quasi-example 1 was tested in a bath of molten metal containing Zn-55% Al (corresponding to a typical zinc-aluminum plating bath containing Al:55 wt %, Zn:43.4 wt % and Sis:1.6 wt % as the molten metal). The examples 11 and 12 the same as the cage specimens according to the quasi-examples 5 and 6 were tested in a bath of molten aluminum. As shown in FIG. 5, the examples 10 to 12 having specific gravity within the range of the present invention with respect to the respective molten metal were tested under the same conditions as the above-described wear tests except for types of the molten metal. Results of the wear tests are shown in the following Table 5. According to the examples 10 to 12, since the cage specimens have specific gravity of 0.8 to 1.2 with respect to the respective molten metal, the examples 10 to 12 fall within the allowed values in the results of both pocket wear amounts and guide surface wear amounts, as shown in Table 5. Further, since all the cage specimens according to the examples 10 to 12 contain graphite therein, the high wear resistance can be obtained such as the ball wear amounts thereof are "0.00".

Moreover, in addition to the molten metal as described in Tables 1 and 5, it may be used in the bath for the other molten metal such as, for example, Zn-0.15% Al, Zn-4.1% Al-0.09% Mg, Al-9% Si, Zn-55% Al-1.5% Si or the like. With these molten metal baths, as long as it is used for the rolling bearing adjusted so that the cage material has specific gravity of 0.8 to 1.2 with respect to the respective molten metal, the present invention can obtain the same effects as in the molten zinc.

TABLE 5

| Test Sample No. | Composition & Structure of Cage Specimen | Molten Metal | Specific Gravity with Respect to Molten Metal | Pocket Wear Amount (mm) | Guide Surface Wear Amount (mm) | Ball Wear Amount (mm) |
| --- | --- | --- | --- | --- | --- | --- |
| Example 10 | Same as Quasi-Example 1 | Zn-55% Al | 1.0 | 0.4 | 0.02 | 0.00 |
| Example 11 | Same as Quasi-Example 5 | Al | 0.9 | 0.3 | 0.01 | 0.00 |
| Example 12 | Same as Quasi-Example 6 | Al | 0.9 | 0.4 | 0.02 | 0.00 |

As described above, according to the present invention, due to the fact that a cage in a rolling bearing to be used in molten metal is formed of a solid lubricant or a composite material containing a solid lubricant, the amounts of wear of the inner and outer races and rolling elements of the rolling bearing can be reduced. As a result of this, the life of the rolling bearing to be used in molten metal can be extended.

Also, according to the present invention, since the cage of the rolling bearing to be used in molten metal is formed of a material having specific gravity of 0.8 to 1.2 with respect to the molten metal, the wear resistance of the cage can be improved. This also results in the extended life of the rolling bearing to be used in the molten metal.

What is claimed is:

1. A rolling bearing apparatus, comprising:

a bath;

molten metal disposed in the bath; and a rolling bearing positioned in the bath for supporting a member, the rolling bearing comprising:

an outer race including an outer raceway on an inner circumferential surface thereof;

an inner race including an inner raceway on an outer circumferential surface thereof;

a cage including a plurality of pockets in the circumferential direction, and being formed of a material having a corrosion resistance to the molten metal; and a plurality of rolling elements being rollingly retained within the pockets and being abutted against the outer raceway and the inner raceway, wherein the material has specific gravity of 0.8 to 1.2, inclusive, with respect to the molten.

2. The apparatus of claim 1, wherein the cage contains a solid lubricant which is exposed at least in contact surfaces between the cage and the rolling elements.

3. The apparatus of claim 2, wherein the solid lubricant is exposed at least in contact surfaces between the cage and the inner and outer races.

4. The apparatus of claim 6, wherein the solid lubricant comprises a material selected from the group consisting of graphite, C/C composite, hexagonal boron nitride (h-BN), molybdenum disulfide, tungsten disulfide, $CaF_2/BaF_2$, chrome oxide and compound thereof.

5. The apparatus of claim 1, wherein the cage is formed of a metal selected from the group consisting of Ta, W, Nb, Mo, Re, Os, Ir, Pt, Au, alloy thereof, carbide thereof, boride thereof, and nitride thereof.

\* \* \* \* \*

UNITED STATES PATENT AND TRADEMARK OFFICE
CERTIFICATE OF CORRECTION

PATENT NO. : 5,520,467
DATED : May 28, 1996
INVENTOR(S) : Katsuhiro NOJIMA et al.

It is certified that error appears in the above-identified patent and that said Letters Patent is hereby corrected as shown below:

On the title page,
item 73, delete "NGK Ltd." and insert --NSK Ltd.--.

Column 12, line 20, claim 1, after "molten" insert --metal--;

line 29, claim 4, delete "6" and insert --2--.

Signed and Sealed this

Fifteenth Day of October, 1996

Attest:

BRUCE LEHMAN

*Attesting Officer*     *Commissioner of Patents and Trademarks*